(12) United States Patent
Akiyama

(10) Patent No.: US 11,183,687 B2
(45) Date of Patent: Nov. 23, 2021

(54) METHOD OF PRODUCING ELECTRODE PLATE AND ELECTRODE PLATE

(71) Applicant: TOYOTA JIDOSHA KABUSHIKI KAISHA, Toyota (JP)

(72) Inventor: Naohisa Akiyama, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 120 days.

(21) Appl. No.: 16/139,469

(22) Filed: Sep. 24, 2018

(65) Prior Publication Data

US 2019/0103606 A1  Apr. 4, 2019

(30) Foreign Application Priority Data

Oct. 2, 2017 (JP) .............. JP2017-192696

(51) Int. Cl.
*H01M 4/36* (2006.01)
*H01M 4/04* (2006.01)
*H01M 10/0525* (2010.01)
*H01M 4/13* (2010.01)
*H01M 4/139* (2010.01)
*H01M 4/62* (2006.01)
*H01M 4/02* (2006.01)

(52) U.S. Cl.
CPC ......... *H01M 4/366* (2013.01); *H01M 4/0404* (2013.01); *H01M 4/13* (2013.01); *H01M 4/139* (2013.01); *H01M 4/624* (2013.01); *H01M 10/0525* (2013.01); *H01M 4/0435* (2013.01); *H01M 4/0471* (2013.01); *H01M 2004/028* (2013.01)

(58) Field of Classification Search
CPC .............................. H01M 4/624; H01M 4/625
See application file for complete search history.

(56) References Cited

U.S. PATENT DOCUMENTS

| 2013/0089780 A1* | 4/2013 | Uezono .................. H01M 4/04 |
| | | 429/211 |
| 2016/0141597 A1* | 5/2016 | Umeyama .......... H01M 4/0404 |
| | | 156/62.2 |
| 2016/0248085 A1* | 8/2016 | Umeyama ............. H01M 4/139 |
| 2017/0069906 A1 | 3/2017 | Saka et al. |
| 2019/0173087 A1* | 6/2019 | Sawada .................. H01G 11/38 |

FOREIGN PATENT DOCUMENTS

| CN | 105914346 A | 8/2016 |
| JP | 2016-154100 A | 8/2016 |
| JP | 2016-164837 A | 9/2016 |
| JP | 2017-054637 A | 3/2017 |

* cited by examiner

Primary Examiner — Nathanael T Zemui
(74) Attorney, Agent, or Firm — Sughrue Mion, PLLC

(57) ABSTRACT

A method of producing an electrode plate includes forming a particle aggregate, forming an undried active material layer, and drying the undried active material layer. When the particle aggregate is formed, conductive particles include first conductive particles which have a three-dimensional structure in which primary particles with an average primary particle size of 30 nm to 80 nm are connected to each other and have an average structure length of 260 nm to 500 nm and second conductive particles which have a three-dimensional structure in which primary particles with an average primary particle size of 8 nm to 13 nm are connected to each other and have an average structure length of 80 nm to 250 nm.

14 Claims, 8 Drawing Sheets

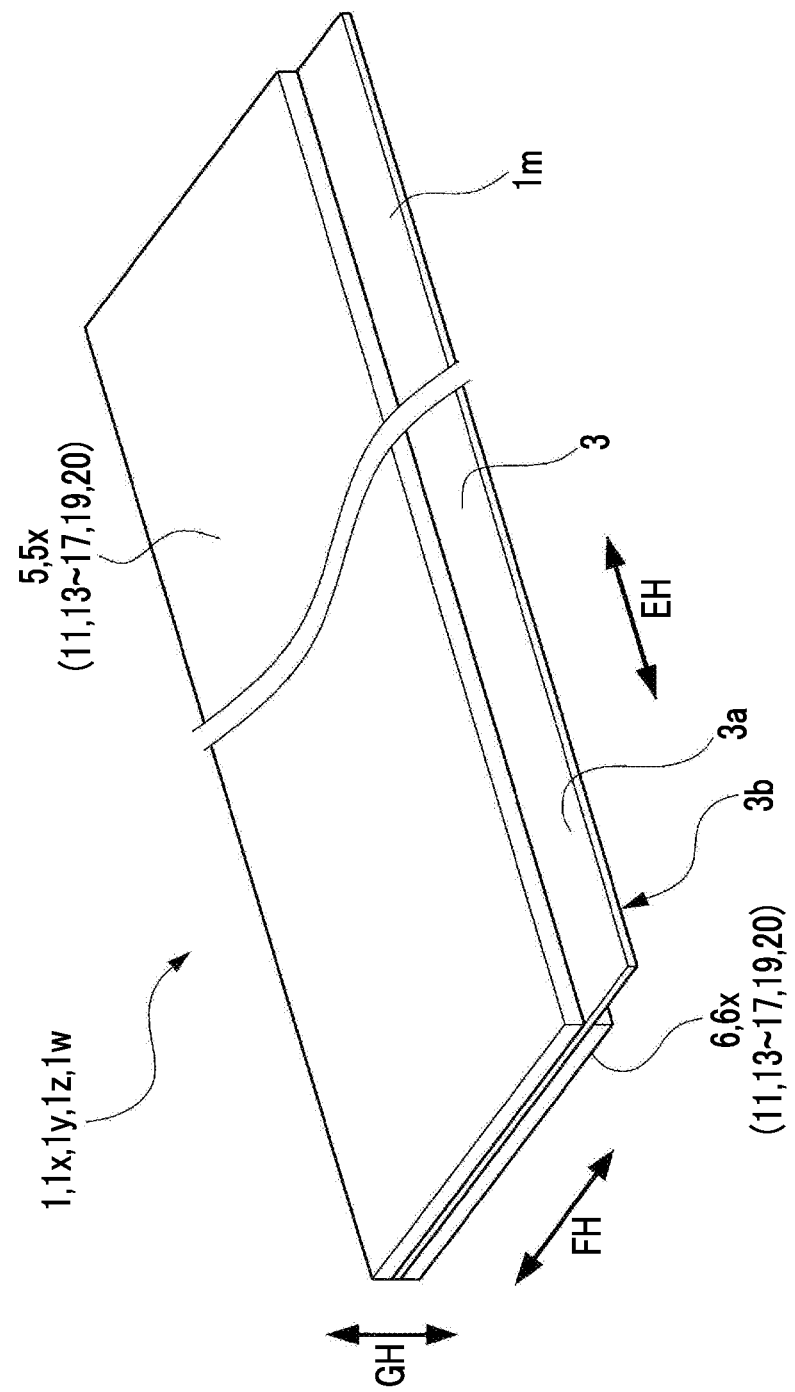

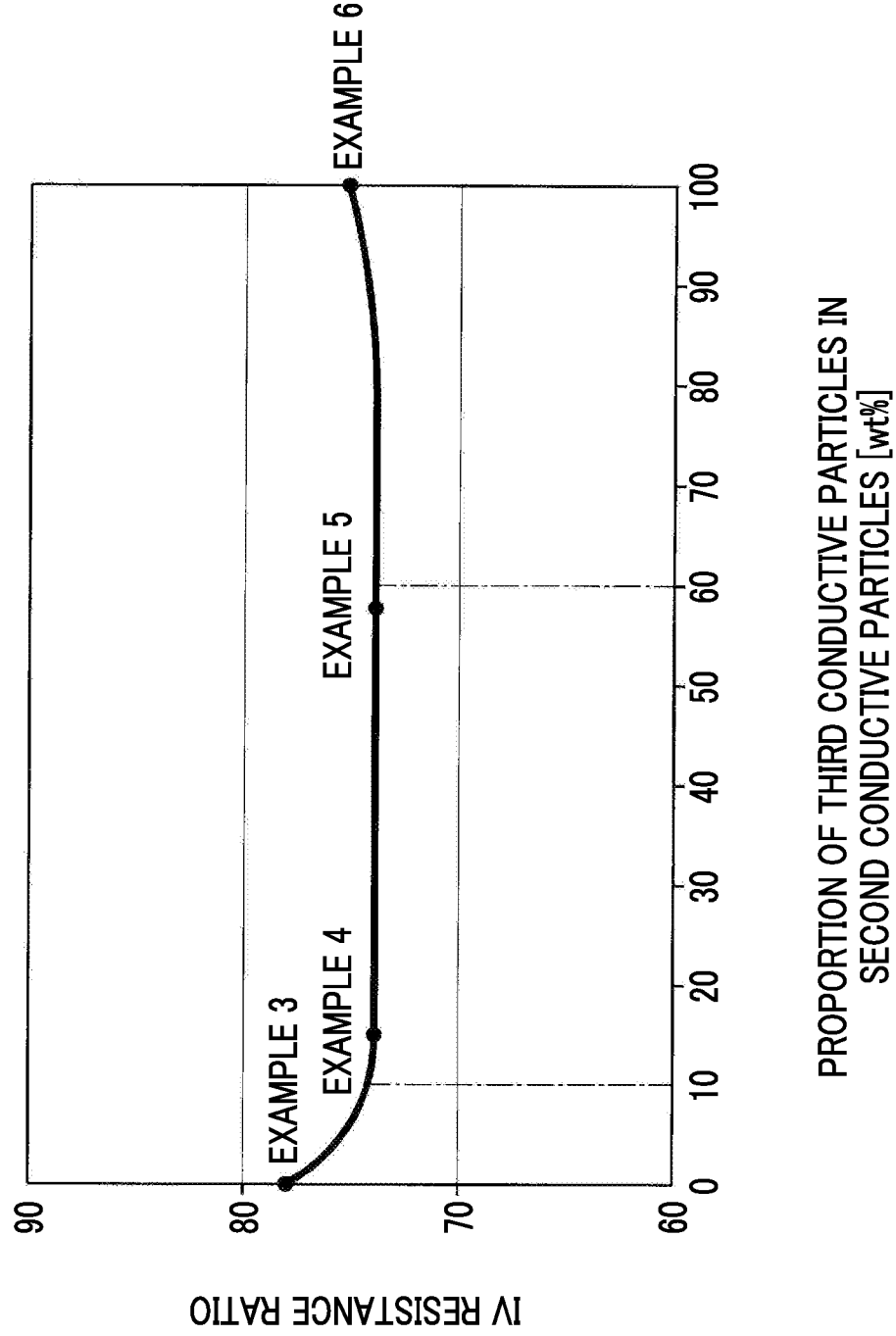

METHOD OF PRODUCING ELECTRODE PLATE AND ELECTRODE PLATE

INCORPORATION BY REFERENCE

The disclosure of Japanese Patent Application No. 2017-192696 filed on Oct. 2, 2017 including the specification, drawings and abstract is incorporated herein by reference in its entirety.

BACKGROUND

1. Technical Field

The present disclosure relates to a method of producing an electrode plate that includes a current collector foil and an active material layer which is formed on the current collector foil and contains active material particles and conductive particles, and the electrode plate.

2. Description of Related Art

Among electrode plates used for power storage devices such as lithium ion secondary batteries, lithium ion capacitors, and the like, an electrode plate including a current collector foil and an active material layer formed on the current collector foil is known. Such an electrode plate is produced by, for example, the following method. That is, an active material paste in which active material particles and conductive particles are dispersed in a solvent is prepared. Then, the active material paste is applied to the current collector foil using a coating device such as a die coater, and an undried active material layer is formed on the current collector foil. Then, the undried active material layer is heated and dried to form an active material layer.

However, in the above method, since a proportion of the solvent contained in the active material paste is large, an amount of the solvent contained in the undried active material layer is larger, and it takes a long time to evaporate the solvent from the undried active material layer and form the active material layer. Thus, production of an electrode plate by the following method has been studied in order to solve such problems. That is, active material particles and conductive particles are mixed, a solvent is additionally added thereto, and mixing and granulating are performed to obtain a particle aggregate including wet particles. In the particle aggregate including such wet particles, a proportion of the solvent contained can be reduced to, for example, 30 wt % or less.

Then, a roll press machine including a first roller, a second roller that is disposed parallel to the first roller with a gap therebetween, and a third roller that is disposed parallel to the second roller with a gap therebetween is prepared. In addition, the above particle aggregate is passed between the first roller and the second roller, and an undried film is formed on the second roller. Subsequently, the undried film is transferred onto the current collector foil that has passed between the second roller and the third roller, and the undried active material layer is formed on the current collector foil. Then, the undried active material layer is heated and dried to form an active material layer. Here, as related art connected to this, for example, Japanese Unexamined Patent Application Publication No. 2017-54637 (refer to FIG. 2 and FIG. 3 in JP 2017-54637 A) may be exemplified.

SUMMARY

However, it is found that it is difficult for conductive particles to sufficiently disperse when active material particles and conductive particles are mixed together, and the dispersibility of conductive particles in wet particles is not sufficient. Thus, when an active material layer is formed using a particle aggregate including the wet particles, the dispersibility of the conductive particles in the active material layer is lowered and the conductivity of the active material layer is lowered. In order to improve the conductivity of the active material layer, a proportion of the conductive particles in the active material layer may be increased. However, when a proportion of the conductive particles is increased, since a proportion of the active material particles is reduced conversely, a capacity such as a battery capacity is reduced. Therefore, it is necessary to improve the conductivity of the active material layer without increasing a proportion of the conductive particles in the active material layer.

The present disclosure provides a method of producing an electrode plate through which it is possible to easily produce an electrode plate including an active material layer having favorable conductivity while the active material layer is formed using a particle aggregate including wet particles and the electrode plate.

A first aspect of the present disclosure is a method of producing an electrode plate including a current collector foil and an active material layer which is formed on the current collector foil and contains active material particles. The method includes mixing the active material particles, the conductive particles, and a solvent, and performing granulating to form a particle aggregate including wet particles, forming an undried active material layer on the current collector foil using the particle aggregate, and drying the undried active material layer and forming the active material layer. the conductive particles include first conductive particles and second conductive particles. The first conductive particles have a three-dimensional structure in which primary particles with an average primary particle size D1 of 30 nm to 80 nm are connected to each other and have an average structure length X1 of 260 nm to 500 nm. The second conductive particles have a three-dimensional structure in which primary particles with an average primary particle size D2 of 8 nm to 13 nm are connected to each other and have an average structure length X2 of 80 nm to 250 nm.

In the method of producing an electrode plate, the particle aggregate including wet particles is formed using conductive particles composed of the first conductive particles and second conductive particles, and additionally, the active material layer is formed using the particle aggregate. Since the first conductive particles have a large average primary particle size D1 of 30 nm or more, even though extremely many primary particles are not connected to each other, it is possible to easily form first conductive particles with an average structure length X1 of 260 nm to 500 nm. On the other hand, since the first conductive particles have an average primary particle size D1 of 80 nm or less, the number of primary particles constituting the first conductive particles contained in the active material layer is too small (contact points between the active material particles and the primary particles of the first conductive particles are too few), and thus it is possible to prevent the conductivity of the active material layer from decreasing. In addition, since the first conductive particles have a large average structure length X1 of 260 nm or more, the dispersibility is favorable. Therefore, it is possible for the first conductive particles to uniformly disperse in the wet particles and to uniformly disperse in the undried active material layer and the active material layer. On the other hand, since the first conductive particles have an average structure length X1 of 500 nm or less, the number of first conductive particles contained in the active material layer is too small, and thus it is possible to prevent the conductivity of the active material layer from decreasing.

Since the second conductive particles have an average primary particle size D2 of 8 nm or more, even though extremely many primary particles are not connected to each other, it is possible to easily form second conductive particles with an average structure length X2 of 80 nm to 250 nm. On the other hand, since the second conductive particles have an average primary particle size D2 of 13 nm or less, the number of primary particles constituting the second conductive particles contained in the active material layer is large (the number of contact points between the active material particles and the primary particles of the second conductive particles is large), and thus it is possible to increase the conductivity of the active material layer. In addition, since the second conductive particles have an average structure length X2 of 80 nm to 250 nm, which is smaller than an average structure length X1=260 nm to 500 nm of the first conductive particles, a conductive path according to the second conductive particles is easily formed in gaps between the active material particles. Thus, according to the production method, while the active material layer is formed using the particle aggregate including wet particles, compared to a case in which an active material layer is formed using only the first conductive particles as the conductive particles and a case in which an active material layer is formed using only the second conductive particles as the conductive particles, it is possible to easily produce an electrode plate including an active material layer having favorable conductivity.

Here, both the "first conductive particles" and the "second conductive particles" have three-dimensional structures (also referred to as "structures") in which primary particles are connected to each other as described above. The "average structure length" is obtained by observing a plurality of (for example, 100) conductive particles under a transmission electron microscope (TEM), drawing the smallest circles in which conductive particles are inscribed, measuring diameters of the circles, and calculating an average value thereof. As the "first conductive particles" and "second conductive particles," carbon black particles, for example, acetylene black particles, may be exemplified.

In addition, in the method of producing an electrode plate, a proportion of the first conductive particles in the conductive particles may be 20 wt % to 45 wt %.

When a proportion of the first conductive particles in the conductive particles is 20 wt % to 45 wt %, it is possible to further improve the conductivity of the active material layer.

In addition, in the method of producing an electrode plate according to any of the above aspects, the second conductive particles may include third conductive particles which have a three-dimensional structure in which primary particles with an average primary particle size D3 of 8 nm to 13 nm are connected to each other and have an average structure length X3 of 150 nm to 250 nm. In addition, the second conductive particles may further include fourth conductive particles which have a three-dimensional structure in which primary particles with an average primary particle size D4 of 8 nm to 13 nm are connected to each other and have an average structure length X4 of 80 nm to 110 nm.

In the method of producing an electrode plate, since the second conductive particles include third conductive particles, and the third conductive particles have an average structure length X3 of 150 nm to 250 nm, a conductive path according to the third conductive particles is easily formed in gaps between the active material particles, and it is possible to improve the conductivity of the active material layer. Here, since the fourth conductive particles have an average structure length X4 of 80 nm to 110 nm, which is smaller than an average structure length X3=150 nm to 250 nm of the third conductive particles, when the fourth conductive particles are contained, a conductive path according to the fourth conductive particles is easily formed in small gaps between the active material particles (gaps in which it is difficult to form a conductive path in the third conductive particles). Thereby, it is possible to further improve the conductivity of the active material layer.

In addition, in the method of producing an electrode plate, a proportion of the third conductive particles in the second conductive particles may be 10 wt % to 60 wt %.

When a proportion of the third conductive particles in the second conductive particles is 10 wt % to 60 wt %, it is possible to further improve the conductivity of the active material layer.

In addition, a second aspect of the present disclosure is an electrode plate including a current collector foil and a dried active material layer formed into a film on the current collector foil using a particle aggregate including wet particles obtained by mixing active material particles, conductive particles, and a solvent, and performing granulating. In the electrode plate, the conductive particles include first conductive particles and second conductive particles. The first conductive particles have a three-dimensional structure in which primary particles with an average primary particle size D1 of 30 nm to 80 nm are connected to each other and have an average structure length X1 of 260 nm to 500 nm. The second conductive particles have a three-dimensional structure in which primary particles with an average primary particle size D2 of 8 nm to 13 nm are connected to each other and have an average structure length X2 of 80 nm to 250 nm.

In the electrode plate, the conductive particles are composed of the first conductive particles and the second conductive particles. Thus, while the active material layer is formed using the particle aggregate including wet particles, it is possible to further improve the conductivity of the active material layer compared to when only the first conductive particles are used as the conductive particles or when only the second conductive particles are used as the conductive particles.

In addition, in the electrode plate, a proportion of the first conductive particles in the conductive particles may be 20 wt % to 45 wt %.

When a proportion of the first conductive particles in the conductive particles is 20 wt % to 45 wt %, it is possible to further improve the conductivity of the active material layer.

In addition, in the electrode plate according to any of the above aspects, the second conductive particles may include third conductive particles which have a three-dimensional structure in which primary particles with an average primary particle size D3 of 8 nm to 13 nm are connected to each other and have an average structure length X3 of 150 nm to 250 nm. In addition, the second conductive particles may further include fourth conductive particles which have a three-dimensional structure in which primary particles with an average primary particle size D4 of 8 nm to 13 nm are connected to each other and have an average structure length X4 of 80 nm to 110 nm.

In the electrode plate, the second conductive particles include the third conductive particles and the fourth conductive particles. Thus, it is possible to further improve the conductivity of the active material layer.

In addition, in the electrode plate, a proportion of the third conductive particles in the second conductive particles may be 10 wt % to 60 wt %.

When a proportion of the third conductive particles in the second conductive particles is 10 wt % to 60 wt %, it is possible to further improve the conductivity of the active material layer.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a perspective view of a positive electrode plate according to an embodiment;

FIG. 8 is a graph showing the relationship between a proportion of third conductive particles in second conductive particles and IV resistance ratios in the batteries of Examples 3 to 6.

DETAILED DESCRIPTION OF EMBODIMENTS

Figure 2A:
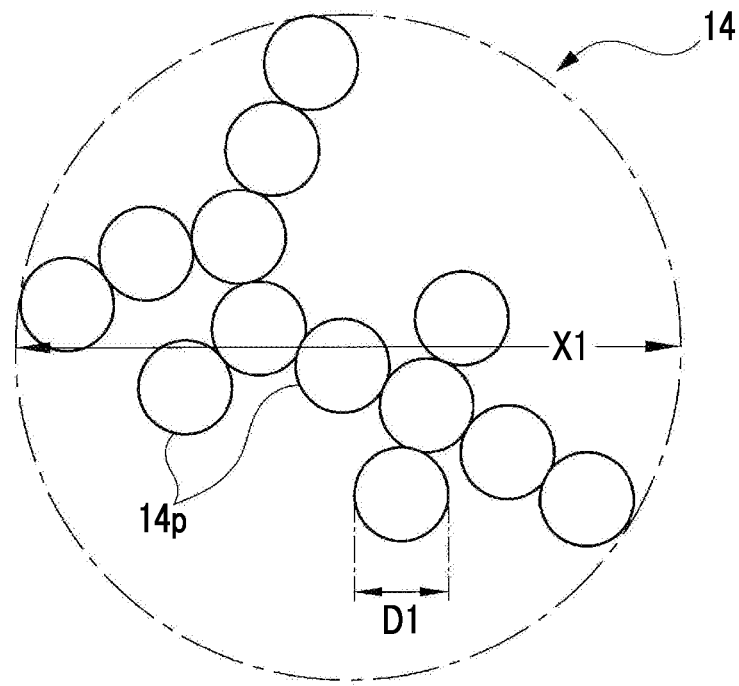
FIG. 2A is an explanatory diagram showing a form example of first conductive particles.

Embodiments of the present disclosure will be described below with reference to the drawings. FIG. 1 shows a perspective view of a positive electrode plate (electrode plate) 1 according to the present embodiment. In the following description, a longitudinal direction EH, a width direction FH and a thickness direction GH of the positive electrode plate 1 are defined as directions shown in FIG. 1. The positive electrode plate 1 is a band-like positive electrode plate that is used to produce a rectangular and closed type lithium ion secondary battery mounted in a vehicle such as a hybrid vehicle, a plug-in hybrid vehicle, and an electric vehicle, and specifically, to produce a flat-wound type electrode body.

The positive electrode plate 1 includes a current collector foil 3 made of a band-like aluminum foil that extends in the longitudinal direction EH. A first active material layer 5 is formed in a band shape on an area that is a part of a first main surface 3a of the current collector foil 3 in the width direction FH and extends in the longitudinal direction EH. In addition, a second active material layer 6 is formed in a band shape on an area that is a part of a second main surface 3b on the side opposite to the current collector foil 3 in the width direction FH and extends in the longitudinal direction EH. One end of the positive electrode plate 1 in the width direction FH becomes an exposed part 1m in which there is no first active material layer 5 or second active material layer 6 in the thickness direction GH and the current collector foil 3 is exposed in the thickness direction GH.

The first active material layer 5 and the second active material layer 6 each include active material particles 11, conductive particles 13, and a binding agent 19. A ratio between the active material particles 11, the conductive particles 13, and the binding agent 19 is active material particles:conductive particles:binding agent=94.5:4.0:1.5. In addition, in the present embodiment, the active material particles 11 are lithium transition metal composite oxide particles, and more specifically, lithium nickel cobalt manganese oxide particles. In addition, the binding agent 19 is polyvinylidene fluoride (PVDF).

The conductive particles 13 include first conductive particles 14 and second conductive particles 15. A proportion of the first conductive particles 14 in the conductive particles 13 is 20 wt % to 45 wt % (30 wt % in the present embodiment), and a proportion of the second conductive particles 15 in the conductive particles 13 is the remaining 70 wt %. However, the second conductive particles 15 include third conductive particles 16 and fourth conductive particles 17. A proportion of the third conductive particles 16 in the second conductive particles 15 is 57 wt % (a proportion of the third conductive particles 16 in the entire conductive particles 13 is 40 wt %). A proportion of the fourth conductive particles 17 in the second conductive particles 15 is 43 wt % (a proportion of the fourth conductive particles 17 in the entire conductive particles 13 is 30 wt %). Conductive particles of the first conductive particles 14 to the fourth conductive particles 17 are all acetylene black particles.

Among them, as shown in FIG. 2A, the first conductive particles 14 have a three-dimensional structure in which primary particles 14p with an average primary particle size D1 of 30 nm to 80 nm (D1=50 nm in the present embodiment) are connected to each other and have an average structure length X1 of 260 nm to 500 nm (X1=300 nm in the present embodiment). Here, the average structure length X1 is obtained by observing the first conductive particles 14 under a transmission electron microscope (TEM), drawing the smallest circles in which the first conductive particles 14 are inscribed (circle indicated by a dashed line in FIG. 2A), measuring diameters of the circles, and calculating an average value thereof. Average structure lengths X2 to X4 to be described below are obtained in the same manner (refer to FIGS. 2B and 2C).

Figure 2B:
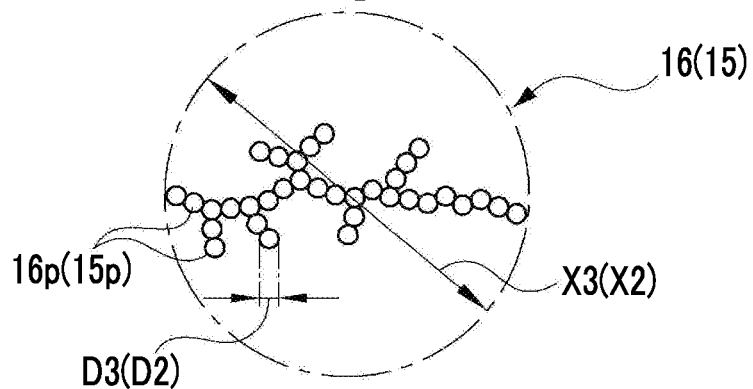
FIG. 2B is an explanatory diagram showing a form example of third conductive particles.
Figure 2C:
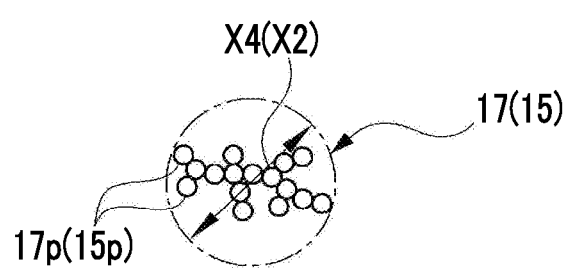
FIG. 2C is an explanatory diagram showing a form example of fourth conductive particles.

On the other hand, the third conductive particles 16 shown in FIG. 2B have a three-dimensional structure in which primary particles 16p with an average primary particle size D3 of 8 nm to 13 nm (D3=10 nm in the present embodiment) are connected to each other and have an average structure length X3 of 150 nm to 250 nm (X3=200 nm in the present embodiment). In addition, the fourth conductive particles 17 shown in FIG. 2C have a three-dimensional structure in which primary particles 17p with an average primary particle size D4 of 8 nm to 13 nm (D4=10 nm in the present embodiment) are connected to each other and have an average structure length X4 of 80 nm to 110 nm (X4=100 nm in the present embodiment). Therefore, the second conductive particles 15 composed of the third conductive particles 16 and the fourth conductive particles 17 have a three-dimensional structure in which primary particles 15p with an average primary particle size D2 of 8 nm to 13 nm (D2=10 nm in the present embodiment) are connected to each other and have an average structure length X2 of 80 nm to 250 nm (X2=160 nm in the present embodiment).

Figure 3:
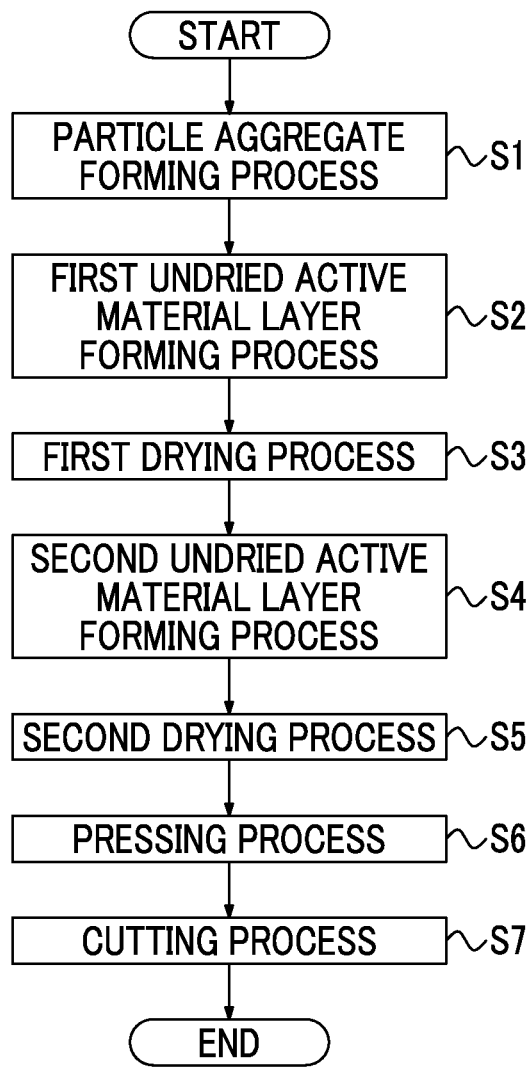
FIG. 3 is a flowchart of a method of producing a positive electrode plate according to an embodiment.
Figure 4:
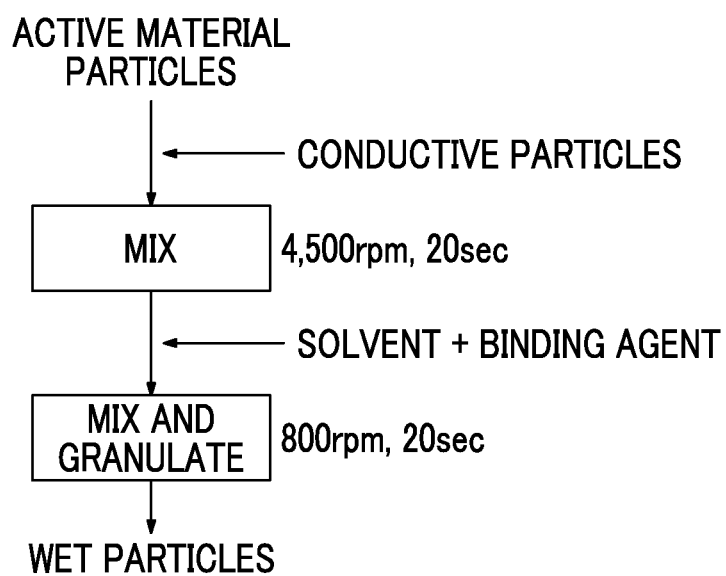
FIG. 4 is an explanatory diagram showing a particle aggregate forming process in the method of producing a positive electrode plate according to the embodiment.

Next, a method of producing the positive electrode plate 1 will be described (refer to FIG. 3 to FIG. 5). First, in a "particle aggregate forming process S1," a particle aggregate 22 including wet particles 21 is formed (refer to FIG. 4). The wet particles 21 are particles in a wet state including the plurality of active material particles 11 (lithium nickel cobalt manganese oxide particles in the present embodiment), the plurality of conductive particles 13 (acetylene black particles in the present embodiment), the binding agent 19 (PVDF in the present embodiment), and a solvent 20 (N-methyl-2-pyrrolidone (NMP) in the present embodiment). A solid fraction of the particle aggregate 22 is 70 wt % or more (75 wt % in the present embodiment) (a proportion of the solvent 20 is 25 wt %).

In the particle aggregate forming process S1, a stirring type mixing and granulating device (not shown) capable of mixing and granulating materials is prepared. On the other hand, the first conductive particles 14 and the second conductive particles 15 (the third conductive particles 16 and the fourth conductive particles 17) are prepared, and first conductive particles, third conductive particles, and fourth conductive particles are mixed at a weight ratio of 30:40:30 to obtain conductive particles 13.

As described above, the first conductive particles 14 are acetylene black particles that have a three-dimensional structure in which primary particles 14p with an average primary particle size D1 of 30 nm to 80 nm (D1=50 nm in the present embodiment) are connected to each other and have an average structure length X1 of 260 nm to 500 nm (X1=300 nm in the present embodiment). Regarding the first conductive particles 14, since the average primary particle size D1 is large at 30 nm or more, even though extremely many primary particles 14p are not connected to each other, it is possible to easily form acetylene black particles with an average structure length X1 of 260 nm to 500 nm.

In addition, the second conductive particles 15 are acetylene black particles that have a three-dimensional structure in which primary particles 15p with an average primary particle size D2 of 8 nm to 13 nm (D2=10 nm in the present embodiment) are connected to each other and have an average structure length X2 of 80 nm to 250 nm (X2=160 nm in the present embodiment). Regarding the second conductive particles 15, since the average primary particle size D2 is 8 nm or more, even though extremely many primary particles 15p are not connected to each other, it is possible to easily form acetylene black particles with an average structure length X2 of 80 nm to 250 nm.

In addition, the third conductive particles 16 are acetylene black particles that have a three-dimensional structure in which primary particles 16p with an average primary particle size D3 of 8 nm to 13 nm (D3=10 nm in the present embodiment) are connected to each other and have an average structure length X3 of 150 nm to 250 nm (X3=200 nm in the present embodiment). In addition, the fourth conductive particles 17 are acetylene black particles that have a three-dimensional structure in which primary particles 17p with an average primary particle size D4 of 8 nm to 13 nm (D4=10 nm in the present embodiment) are connected to each other and have an average structure length X4 of 80 nm to 110 nm (X4=100 nm in the present embodiment).

Next, the active material particles 11 are put into the stirring type mixing and granulating device and mixed, the conductive particles 13 are added thereto, and these are dried and mixed at 4,500 rpm for 20 seconds. Then, a binding agent solution in which the binding agent 19 is dissolved is added to the solvent 20, and mixing and granulating are performed at 800 rpm for 20 seconds. Thereby, the particle aggregate 22 including the wet particles 21 with a particle size of about 1 mm to 2 mm is obtained.

Next, in a "first undried active material layer forming process S2," an undried film 22x is formed from the particle aggregate 22 including the wet particles 21, and additionally, the undried film 22x is transferred to the first main surface 3a of the current collector foil 3, and a first undried active material layer 5x is formed on the current collector foil 3. A positive electrode plate having the first undried active material layer 5x on the current collector foil 3 is referred to as a "one-undried-side positive electrode plate 1x." The first undried active material layer forming process S2 is performed using an electrode plate production device 100 schematically shown in FIG. 5.

The electrode plate production device 100 includes three rollers. Specifically, the electrode plate production device 100 includes a first roller 110, a second roller 120 that is disposed parallel to the first roller 110 with a first gap KG1 therebetween, and a third roller 130 that is disposed parallel to the second roller 120 with a second gap KG2 therebetween. In addition, the electrode plate production device 100 includes an aggregate supply unit 140 configured to supply the particle aggregate 22 including the wet particles 21 toward the first gap KG1 above the first gap KG1 between the first roller 110 and the second roller 120.

Figure 5:
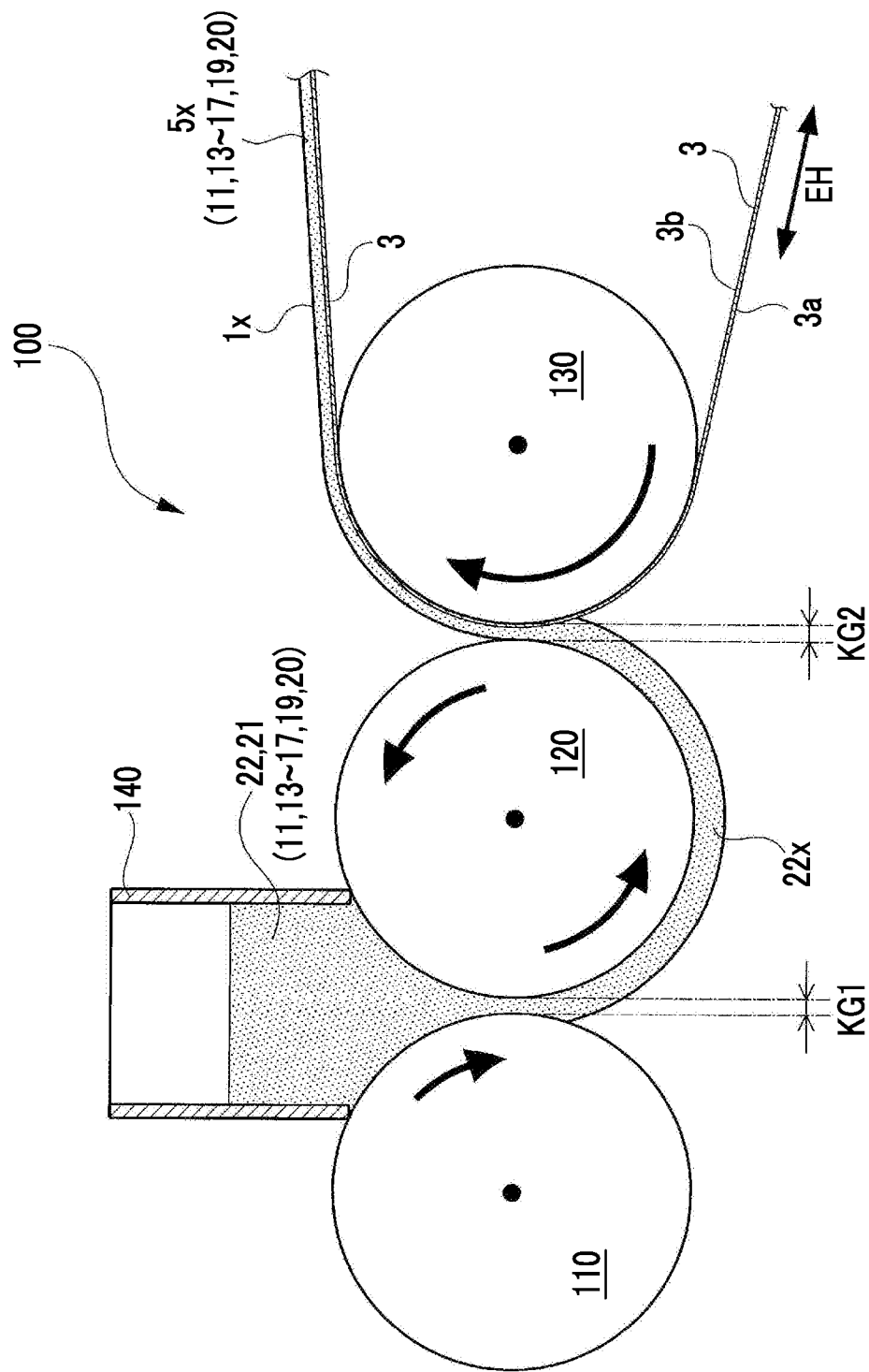
FIG. 5 is an explanatory diagram showing a first undried active material layer forming process in the method of producing a positive electrode plate according to the embodiment.

When the first undried active material layer forming process S2 is performed, the first to third rollers 110, 120, and 130 are rotated in rotation directions indicated by arrows in FIG. 5. That is, the first roller 110 and the third roller 130 are rotated in the same rotation direction (clockwise in the present embodiment), and the second roller 120 is rotated in a direction opposite thereto (counterclockwise in the present embodiment).

Next, the particle aggregate 22 including the wet particles 21 is put into the aggregate supply unit 140. The supplied particle aggregate 22 is supplied toward the first gap KG1 between the first roller 110 and the second roller 120, passes through a gap between the first roller 110 and the second roller 120, and forms the undried film 22x in a film form that is pushed downward in FIG. 5. In addition, the undried film 22x is held on the second roller 120 and conveyed toward the third roller 130.

Subsequently, while the current collector foil 3 is passed between the second roller 120 and the third roller 130, the undried film 22x held on the second roller 120 is transferred to the first main surface 3a of the current collector foil 3 between the second roller 120 and the third roller 130. Here, the band-like current collector foil 3 is withdrawn from a supply roll (not shown) and wound around the third roller 130, and thus is passed between the second roller 120 and the third roller 130.

The current collector foil 3 conveyed by the third roller 130 comes in contact with the undried film 22x held on the second roller 120 between the second roller 120 and the third roller 130. Then, the undried film 22x is transferred onto the first main surface 3a of the current collector foil 3 between the second roller 120 and the third roller 130, and the first undried active material layer 5x is formed on the current collector foil 3. The one-undried-side positive electrode plate 1x having the first undried active material layer 5x on the current collector foil 3 is conveyed rightward in FIG. 5 by the third roller 130.

Next, in a "first drying process S3," the first undried active material layer 5x on the current collector foil 3 is dried and the first active material layer 5 is formed. Specifically, the one-undried-side positive electrode plate 1x is conveyed into a drying device (not shown), hot air is blown to the first undried active material layer 5x in the one-undried-side positive electrode plate 1x, the solvent 20 remaining on the first undried active material layer 5x is evaporated, and thus the first active material layer 5 is formed. Thereby, a one side positive electrode plate 1y having the first active material layer 5 on the current collector foil 3 is formed.

Next, in a "second undried active material layer forming process S4," the undried film 22x is formed from the particle aggregate 22 including the wet particles 21, and additionally, the undried film 22x is transferred to the other second main surface 3b of the current collector foil 3, and a second undried active material layer 6x is formed on the current collector foil 3. Similarly, the second undried active material layer 6x is formed in the first undried active material layer forming process S2 using the electrode plate production device 100. Here, at this point, the dried first active material layer 5 is formed on the first main surface 3a of the current collector foil 3, and the second undried active material layer 6x that is undried is formed on the second main surface 3b of the current collector foil 3. This positive electrode plate is referred to as a "one-dried-side double-side positive electrode plate 1z."

Next, in a "second drying process S5," the second undried active material layer 6x on the current collector foil 3 is dried and the second active material layer 6 is formed. Specifically, as in the first drying process S3, the one-dried-side double-side positive electrode plate 1z is conveyed into a drying device (not shown), hot air is blown to the second undried active material layer 6x in the one-dried-side double-side positive electrode plate 1z, and the second active material layer 6 is formed. Therefore, a positive electrode plate 1w including the current collector foil 3, the first active material layer 5 and the second active material layer 6 is formed.

Next, in a "pressing process S6," the positive electrode plate 1w is pressed by a roll press machine (not shown), and the densities of the first active material layer 5 and the second active material layer 6 are increased. Next, in a "cutting process S7," the center of the positive electrode plate 1w in the width direction FH is cut in the longitudinal direction EH. Thus, the positive electrode plate 1 shown in FIG. 1 is completed.

Examples and Comparative Examples

Next, results of tests that were performed to verify effects of the present disclosure will be described. As Examples 1 to 6 and Comparative Examples 1 and 2, as shown in Table 1, 8 types of positive electrode plates were produced in the same manner as in the embodiment except that the conductive particles 13 were varied. Here, the positive electrode plate of Example 5 was the same as the positive electrode plate 1 of the embodiment. Specifically, in Comparative Example 1, the first active material layer 5 and the second active material layer 6 were formed using only the first conductive particles 14 as the conductive particles 13. On the other hand, in Comparative Example 2, the first active material layer 5 and the second active material layer 6 were formed using only the second conductive particles 15 as the conductive particles 13.

On the other hand, in Example 1, the first active material layer 5 and the second active material layer 6 were formed using the first conductive particles 14 and the second conductive particles 15 at a weight ratio of first conductive particles:second conductive particles=70:30 as the conductive particles 13. In addition, in Example 2, the first active material layer 5 and the second active material layer 6 were formed using the first conductive particles 14 and the second conductive particles 15 at a weight ratio of first conductive particles:second conductive particles=50:50 as the conductive particles 13. In addition, in Examples 3 to 6, the first active material layer 5 and the second active material layer 6 were formed using the first conductive particles 14 and the second conductive particles 15 at a weight ratio of first conductive particles:second conductive particles=30:70 as the conductive particles 13.

Here, in Examples 1 to 3 and Comparative Example 2, only the fourth conductive particles 17 were used as the second conductive particles 15. On the other hand, in Example 6, only the third conductive particles 16 were used as the second conductive particles 15. On the other hand, in Examples 4 and 5, the third conductive particles 16 and the fourth conductive particles 17 were used as the second conductive particles 15. Specifically, in Example 4, a weight ratio between the third conductive particles 16 and the fourth conductive particles 17 in the second conductive particles 15 was third conductive particles:fourth conductive particles=14:86. In addition, in Example 5, a weight ratio between the third conductive particles 16 and the fourth conductive particles 17 in the second conductive particles 15 was third conductive particles:fourth conductive particles=57:43.

TABLE 1

|  | Proportion in mixed conductive particles (wt %) | | Details of third and fourth conductive particles (proportion in second conductive particles) (wt %) | | |
|---|---|---|---|---|---|
|  | First conductive particles D1 = 50 nm X1 = 300 nm | Second conductive particles D2 = 10 nm X2 = 100 nm to 200 nm | Third conductive particles D3 = 10 nm X3 = 200 nm | Fourth conductive particles D4 = 10 nm X4 = 100 nm | IV resistance ratio |
| Comparative Example 1 | 100 | 0 | 0 (0) | 0 (0) | 100 |
| Comparative Example 2 | 0 | 100 | 0 (0) | 100 (100) | 110 |
| Example 1 | 70 | 30 | 0 (0) | 30 (100) | 97 |
| Example 2 | 50 | 50 | 0 (0) | 50 (100) | 83 |

TABLE 1-continued

| | Proportion in mixed conductive particles (wt %) | | Details of third and fourth conductive particles (proportion in second conductive particles) (wt %) | | |
|---|---|---|---|---|---|
| | First conductive particles D1 = 50 nm X1 = 300 nm | Second conductive particles D2 = 10 nm X2 = 100 nm to 200 nm | Third conductive particles D3 = 10 nm X3 = 200 nm | Fourth conductive particles D4 = 10 nm X4 = 100 nm | IV resistance ratio |
| Example 3 | 30 | 70 | 0 (0) | 70 (100) | 78 |
| Example 4 | 30 | 70 | 10 (14) | 60 (86) | 74 |
| Example 5 | 30 | 70 | 40 (57) | 30 (43) | 74 |
| Example 6 | 30 | 70 | 70 (0) | 0 (0) | 75 |

In addition, batteries were produced using the positive electrode plates of Examples 1 to 6 and Comparative Examples 1 and 2, and IV resistance values of the batteries were measured. Specifically, as negative electrode plates that were the same in Examples 1 to 6 and Comparative Examples 1 and 2, negative electrode plates including an active material layer containing active material particles (natural graphite) and a binding agent (carboxymethyl cellulose (CMC)) on both main surfaces of a current collector foil made of a band-like copper foil were prepared. In addition, the negative electrode plates and the positive electrode plates according to Examples 1 to 6 and Comparative Examples 1 and 2 were laminated with a pair of band-like separators therebetween and wound around the axis and thereby flat-wound type electrode bodies were formed. Then, the electrode bodies and a non-aqueous electrolyte solution were accommodated in a rectangular battery case to constitute the batteries.

Next, IV resistance values of the batteries of Examples 1 to 6 and Comparative Examples 1 and 2 were measured using a charging and discharging evaluation device (TOSCAT-3100 commercially available from Toyo System Co. Ltd.). Specifically, the batteries were charged to an SOC of 60% under a temperature environment of 25° C., and IV resistance values of the batteries were measured. For each of Examples 1 to 6 and Comparative Examples 1 and 2, IV resistance values of five (n=5) batteries were measured and an average value thereof was obtained. In addition, the average IV resistance value of the batteries of Comparative Example 1 was set as a reference (=100), and IV resistance ratios of Examples 1 to 6 and Comparative Example 2 were obtained. The results are shown in Table 1 and FIG. 6 to FIG. 8.

Figure 6:
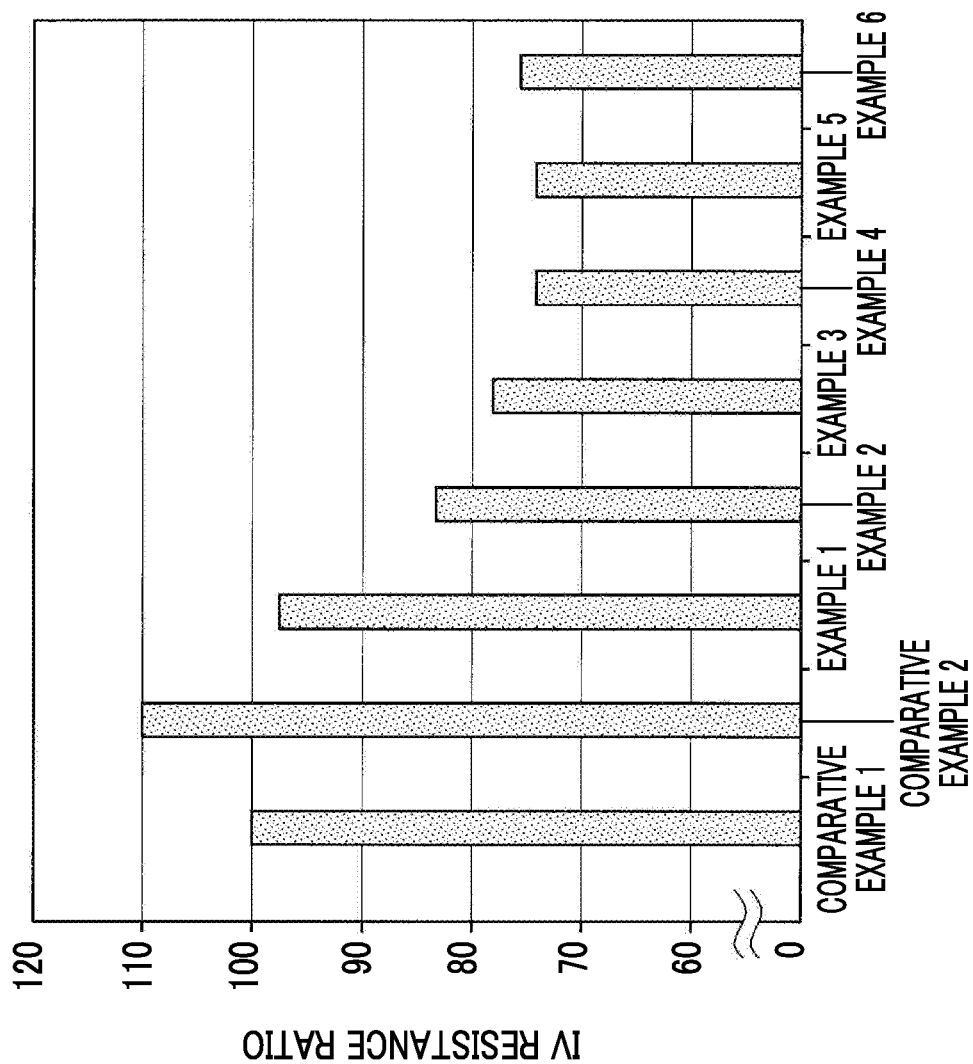
FIG. 6 is a graph showing electrical resistance ratios (IV resistance ratios) of batteries of Examples 1 to 6 and Comparative Examples 1 and 2.
Figure 7:
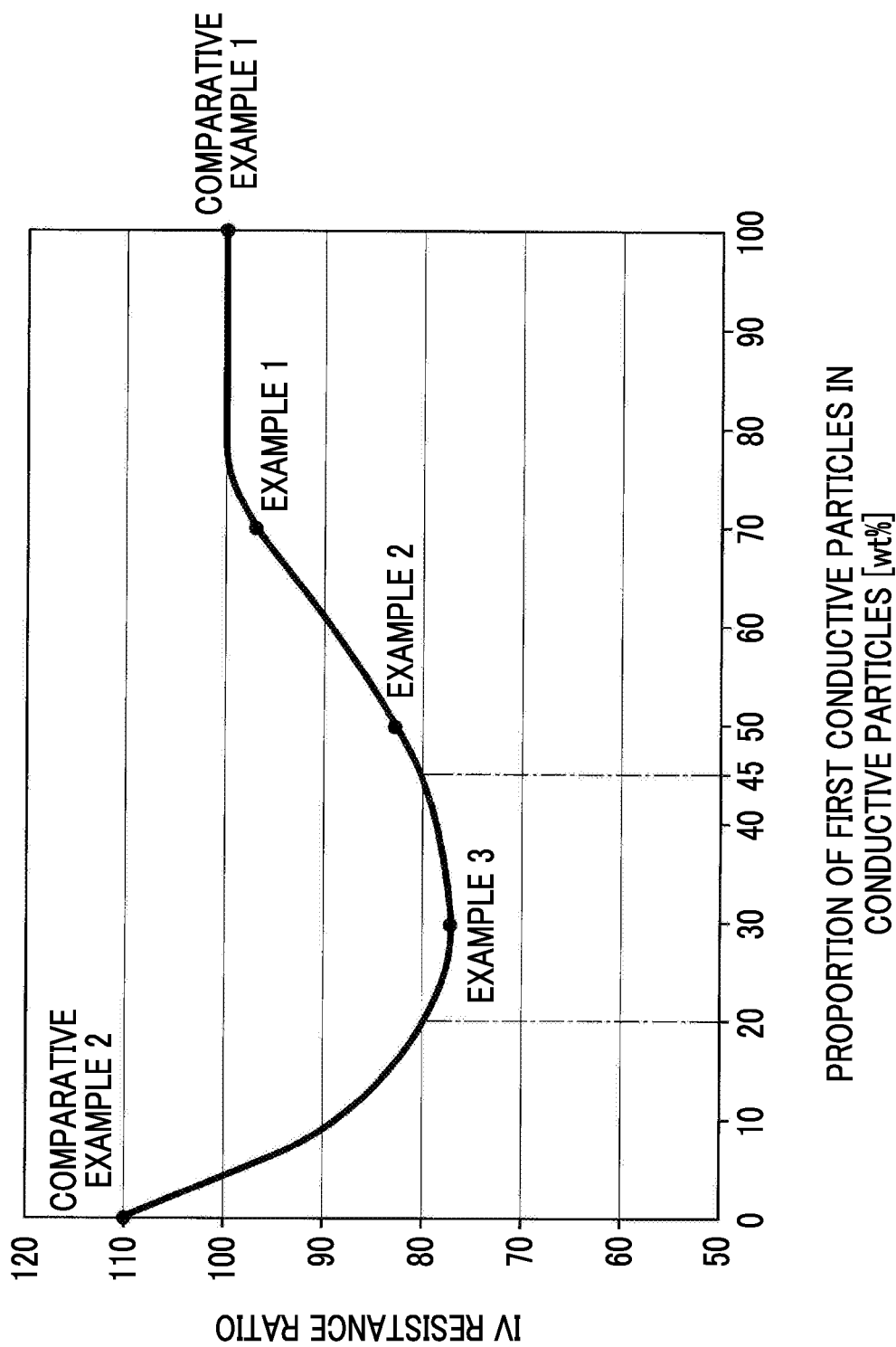
FIG. 7 is a graph showing the relationship between a proportion of first conductive particles in conductive particles and IV resistance ratios in the batteries of Examples 1 to 3 and Comparative Examples 1 and 2.

As can be clearly understood from Table 1 and FIG. 6 to FIG. 8, compared to the batteries of Comparative Examples 1 and 2, in the batteries of Examples 1 to 6, the IV resistance ratio was small and favorable. Among them, in the batteries of Examples 3 to 6, the IV resistance ratios were particularly small and favorable. In particular, in the batteries of Examples 4 to 6, the IV resistance ratio was smaller and more favorable. The reason for these results is speculated as follows.

That is, in the first active material layer 5 and the second active material layer 6 of the positive electrode plate of Comparative Example 1, the conductive particles 13 included only the first conductive particles 14. Since the first conductive particles 14 had a large average structure length X1 of 300 nm, the number of the conductive particles 13 (only the first conductive particles 14) contained in the first active material layer 5 and the second active material layer 6 was smaller than the number of the conductive particles 13 contained in the first active material layer 5 and the second active material layer 6 of Examples 1 to 6 and Comparative Example 2. Therefore, it was thought that the conductivities of the first active material layer 5 and the second active material layer 6 were lowered and the IV resistance values of the batteries were higher.

On the other hand, in the first active material layer 5 and the second active material layer 6 of the positive electrode plate of Comparative Example 2, the conductive particles 13 included only the second conductive particles 15. Since the second conductive particles 15 had a small average structure length X2 of 160 nm, when the active material particles 11 and the conductive particles 13 (only the second conductive particles 15) were mixed together, it was difficult to uniformly disperse the conductive particles 13 and the conductive particles 13 tended to aggregate with each other. Therefore, it was thought that, also in the first active material layer 5 and the second active material layer 6, since the dispersibility of the conductive particles 13 (only the second conductive particles 15) was low and conductivities of the first active material layer 5 and the second active material layer 6 were low, the IV resistance values of the batteries were higher.

On the other hand, in the first active material layer 5 and the second active material layer 6 of the positive electrode plates of Examples 1 to 6, the conductive particles 13 were composed of the first conductive particles 14 and the second conductive particles 15. Since the first conductive particles 14 had an average primary particle size D1 of 50 nm, the number of primary particles constituting the first conductive particles 14 contained in the first active material layer 5 and the second active material layer 6 was too small, and thus it was possible to prevent the conductivities of the first active material layer 5 and the second active material layer 6 from decreasing. In addition, since the first conductive particles 14 had a large average structure length X1 of 300 nm, the dispersibility was favorable. Therefore, it was possible for the first conductive particles 14 to uniformly disperse in the wet particles 21 and to uniformly disperse in the first active material layer 5 and the second active material layer 6. On the other hand, since the first conductive particles 14 had an average structure length X1 of 300 nm, the number of first conductive particles 14 contained in the first active material layer 5 and the second active material layer 6 was too small, and thus it was possible to prevent the conductivities of the first active material layer 5 and the second active material layer 6 from decreasing.

In addition, since the second conductive particles 15 had an average primary particle size D2 of 10 nm, the number of primary particles constituting the second conductive particles 15 contained in the first active material layer 5 and the second active material layer 6 was too large, and thus it was possible to increase the conductivities of the first active material layer 5 and the second active material layer 6. In addition, since the second conductive particles 15 had an average structure length X2 of 160 nm and the average structure length X1 of the first conductive particles 14 was smaller than 300 nm, a conductive path according to the second conductive particles 15 was easily formed in gaps between the active material particles 11. Therefore, it was thought that, compared to a case in which only the first conductive particles 14 were used as the conductive particles 13 (Comparative Example 1) and a case in which only the second conductive particles 15 were used as the conductive particles 13 (Comparative Example 2), in Examples 1 to 6, the conductivities of the first active material layer 5 and the second active material layer 6 were favorable and the IV resistance values of the batteries were low.

In addition, it was thought that, in the batteries of Examples 3 to 6, since a proportion of the first conductive particles 14 in the conductive particles 13 was in a particularly suitable range (20 wt % to 45 wt %) (refer to FIG. 7), the conductivities of the first active material layer 5 and the second active material layer 6 were particularly favorable and the IV resistance values of the batteries were particularly low.

In addition, in the batteries of Examples 4 to 6, the second conductive particles 15 were composed of at least the third conductive particles 16 between the third conductive particles 16 and the fourth conductive particles 17. Since the third conductive particles 16 had an average structure length X3 of 200 nm, a conductive path according to the third conductive particles 16 was easily formed in gaps between the active material particles 11, and it was possible to improve the conductivities of the first active material layer 5 and the second active material layer 6. Here, since the fourth conductive particles 17 had an average structure length X4 of 100 nm, which was smaller than the average structure length X3=200 nm of the third conductive particles 16, in Examples 4 and 5 in which the fourth conductive particles 17 were contained, the conductive path according to the fourth conductive particles 17 was easily formed in small gaps between the active material particles 11 (gaps in which it was difficult to form a conductive path in the third conductive particles 16). Therefore, it was thought that the conductivities of the first active material layer 5 and the second active material layer 6 were further improved and the IV resistance values of the batteries were further decreased.

In addition, it was thought that, in the batteries of Examples 4 and 5, since a proportion of the third conductive particles 16 in the second conductive particles 15 was in a particularly suitable range (10 wt % to 60 wt %) (refer to FIG. 8), the conductivities of the first active material layer 5 and the second active material layer 6 were particularly favorable and the IV resistance values of the batteries were particularly low.

As described above, in the method of producing the positive electrode plate 1, the particle aggregate 22 including the wet particles 21 was formed using the conductive particles 13 composed of the first conductive particles 14 and the second conductive particles 15, and additionally, the first active material layer 5 and the second active material layer 6 were formed using the particle aggregate 22. Since the first conductive particles 14 had a large average primary particle size D1 of 30 nm or more (50 nm in the present embodiment), even though extremely many primary particles 14p were not connected to each other, it was possible to easily form the first conductive particles 14 with an average structure length X1 of 260 nm to 500 nm. On the other hand, since the first conductive particles 14 had an average primary particle size D1 of 80 nm or less (50 nm in the present embodiment), the number of primary particles constituting the first conductive particles 14 contained in the first active material layer 5 and the second active material layer 6 was too small (contact points between the active material particles 11 and the primary particles 14p of the first conductive particles 14 were too few), and thus it was possible to prevent the conductivities of the first active material layer 5 and the second active material layer 6 from decreasing.

In addition, since the first conductive particles 14 had a large average structure length X1 of 260 nm or more (300 nm in the present embodiment), the dispersibility was favorable. Therefore, it was possible for the first conductive particles 14 to uniformly disperse in the wet particles 21 and to uniformly disperse in the first active material layer 5 and the second active material layer 6. On the other hand, since the first conductive particles 14 had an average structure length X1 of 500 nm or less (300 nm in the present embodiment), the number of first conductive particles 14 contained in the first active material layer 5 and the second active material layer 6 was too small, and thus it was possible to prevent the conductivities of the first active material layer 5 and the second active material layer 6 from decreasing.

Since the second conductive particles 15 had an average primary particle size D2 of 8 nm or more (10 nm in the present embodiment), even though extremely many primary particles 15p were not connected to each other, it was possible to easily form the second conductive particles 15 with an average structure length X2 of 80 nm to 250 nm. On the other hand, since the second conductive particles 15 had an average primary particle size D2 of 13 nm or less (10 nm in the present embodiment), the number of primary particles constituting the second conductive particles 15 contained in the first active material layer 5 and the second active material layer 6 was too large (the number of contact points between the active material particles 11 and the primary particles 15p of the second conductive particles 15 was too large), and thus it was possible to increase the conductivities of the first active material layer 5 and the second active material layer 6.

In addition, since the second conductive particles 15 had an average structure length X2 of 80 nm to 250 nm (160 nm in the present embodiment), which was smaller than the average structure length X1=260 nm to 500 nm of the first conductive particles 14, a conductive path according to the second conductive particles 15 was easily formed in gaps between the active material particles 11. Thus, according to the method of producing the positive electrode plate 1, while the first active material layer 5 and the second active material layer 6 were formed using the particle aggregate 22 including the wet particles 21, it was possible to easily produce the positive electrode plate 1 including the first active material layer 5 and the second active material layer 6 having favorable conductivity compared to a case in which only the first conductive particles 14 were used as the conductive particles 13 and a case in which only the second conductive particles 15 were used as the conductive particles 13.

In addition, in the method of producing the positive electrode plate 1, a proportion of the first conductive particles 14 in the conductive particles 13 was 20 wt % to 45 wt % (30 wt % in the present embodiment). Thereby, it was possible to further improve the conductivities of the first active material layer 5 and the second active material layer 6.

In addition, in the method of producing the positive electrode plate 1, the second conductive particles 15 were composed of the third conductive particles 16 and the fourth conductive particles 17. Since the third conductive particles 16 had an average structure length X3 of 150 nm to 250 nm (200 nm in the present embodiment), a conductive path according to the third conductive particles 16 was easily formed in gaps between the active material particles 11, and it was possible to improve the conductivities of the first active material layer 5 and the second active material layer 6. On the other hand, since the fourth conductive particles 17 had an average structure length X4 of 80 nm to 110 nm (100 nm in the present embodiment), which is smaller than the average structure length X3=150 nm to 250 nm of the third conductive particles 16, a conductive path according to the fourth conductive particles 17 was easily formed in small gaps between the active material particles 11 (gaps in which it was difficult to form a conductive path in the third conductive particles 16). Therefore, it was possible to further improve the conductivities of the first active material layer 5 and the second active material layer 6.

In addition, in the method of producing the positive electrode plate 1, a proportion of the third conductive particles 16 in the second conductive particles 15 was 10 wt % to 60 wt %. Thus, it is possible to further improve the conductivities of the first active material layer 5 and the second active material layer 6.

It can be understood that, while the present disclosure has been described above with reference to the embodiments, the present disclosure is not limited to the above embodiments, and various modifications can be made without departing from the spirit and scope of the disclosure. For example, while the positive electrode plate 1 has been exemplified as the electrode plate in the embodiments, the present disclosure can be applied to a negative electrode plate and a method of producing the same.

What is claimed is:

1. A method of producing an electrode plate comprising:
    mixing first conductive particles and second conductive particles to obtain a mixture of conductive particles,
    mixing active material particles, the mixture of conductive particles and a solvent and granulating to form a particle aggregate including wet particles,
    wherein each wet particle has a particle size of from 1 mm to 2 mm, and each wet particle contains the mixture of conductive particles;
    forming an undried active material layer on a current collector foil using the particle aggregate; and
    drying the undried active material layer and forming an active material layer,
    wherein the first conductive particles have a three-dimensional structure in which primary particles with an average primary particle size of 30 nm to 80 nm are connected to each other and have an average structure length of 260 nm to 500 nm, and
    the second conductive particles have a three-dimensional structure in which primary particles with an average primary particle size of 8 nm to 13 nm are connected to each other and have an average structure length of 80 nm to 250 nm.

2. The method according to claim 1, wherein a proportion of the first conductive particles in the conductive particles is 20 wt % to 45 wt %.

3. The method according to claim 1, wherein the second conductive particles include third conductive particles which have a three-dimensional structure in which primary particles with an average primary particle size of 8 nm to 13 nm are connected to each other and have an average structure length of 150 nm to 250 nm.

4. The method according to claim 3, wherein the second conductive particles include fourth conductive particles which have a three-dimensional structure in which primary particles with an average primary particle size of 8 nm to 13 nm are connected to each other and have an average structure length of 80 nm to 110 nm.

5. The method according to claim 4, wherein a proportion of the third conductive particles in the second conductive particles is 10 wt % to 60 wt %.

6. An electrode plate comprising:
    a current collector foil; and
    a dried active material layer formed into a film on the current collector foil using a particle aggregate including wet particles obtained by mixing active material particles, conductive particles, and a solvent, and performing granulating,
    wherein first conductive particles and second conductive particles are intermingled within each particle of the particle aggregate,
    the each particle of the particle aggregate has a particle size of from 1 mm to 2 mm, and
    wherein the first conductive particles have a three-dimensional structure in which primary particles with an average primary particle size of 30 nm to 80 nm are connected to each other and having an average structure length of 260 nm to 500 nm, and
    the second conductive particles having a three-dimensional structure in which primary particles with an average primary particle size of 8 nm to 13 nm are connected to each other, and have an average structure length of 80 nm to 250 nm.

7. The electrode plate according to claim 6, wherein a proportion of the first conductive particles in the conductive particles is 20 wt % to 45 wt %.

8. The electrode plate according to claim 6, wherein the second conductive particles include third conductive particles which have a three-dimensional structure in which primary particles with an average primary particle size of 8 nm to 13 nm are connected to each other and have an average structure length of 150 nm to 250 nm.

9. The electrode plate according to claim 8, wherein the second conductive particles include fourth conductive particles which have a three-dimensional structure in which primary particles with an average primary particle size of 8 nm to 13 nm are connected to each other and have an average structure length of 80 nm to 110 nm.

10. The electrode plate according to claim 9, wherein a proportion of the third conductive particles in the second conductive particles is 10 wt % to 60 wt %.

11. The method according to claim 1, wherein the first conductive particles and the second conductive particles are intermingled within each particle of the particle aggregate.

12. The method according to claim 1, wherein the wet particles each further contains the active material particles and the solvent.

13. The method according to claim 1, wherein the mixture of conductive particles contains only conductive particles.

14. A method of producing an electrode plate comprising:
    mixing first conductive particles and second conductive particles to obtain a mixture of conductive particles;

mixing active material particles and the mixture of conductive particles;

after the mixing of the active material particles and the mixture of conductive particles, adding a solvent to the active material particles and the mixture of conductive particles;

granulating the active material particles, the mixture of conductive particles and solvent to form wet particles, wherein each wet particle has a particle size of from 1 mm to 2 mm;

forming an undried active material layer on a current collector foil using the particle aggregate; and drying the undried active material layer and forming an active material layer, wherein the first conductive particles have a three-dimensional structure in which primary particles with an average primary particle size of 30 nm to 80 nm are connected to each other and have an average structure length of 260 nm to 500 nm, and the second conductive particles have a three-dimensional structure in which primary particles with an average primary particle size of 8 nm to 13 nm are connected to each other and have an average structure length of 80 nm to 250 nm.

\* \* \* \* \*